United States Patent
Seo

(10) Patent No.: US 7,720,155 B2
(45) Date of Patent: May 18, 2010

(54) SYSTEM AND METHOD FOR ESTIMATING MOTION VECTOR FOR TRANSCODING DIGITAL VIDEO

(75) Inventor: Kwang-Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1160 days.

(21) Appl. No.: 10/998,086

(22) Filed: Nov. 24, 2004

(65) Prior Publication Data

US 2005/0111555 A1    May 26, 2005

(30) Foreign Application Priority Data

Nov. 24, 2003    (KR)    ...... 10-2003-0083745

(51) Int. Cl.
    *H04N 7/12*    (2006.01)
(52) U.S. Cl. .................................. 375/240.16
(58) Field of Classification Search ............. 375/240.16
    See application file for complete search history.

(56) References Cited

U.S. PATENT DOCUMENTS

| 6,014,181 | A | 1/2000 | Sun .............................. 348/699 |
| 6,947,603 | B2 * | 9/2005 | Kim ............................ 382/236 |
| 2002/0069218 | A1 * | 6/2002 | Sull et al. ................ 707/501.1 |
| 2003/0118111 | A1 | 6/2003 | Kim et al. |

FOREIGN PATENT DOCUMENTS

| KR | 1020020010171 A | 2/2002 |
| WO | WO 99/29113 A | 6/1999 |

OTHER PUBLICATIONS

Tamer Shanableh et al., "Heterogeneous Video Transcoding to Lower Spatio-Temporal Resolutions and Different Encoding Formats," IEEE Transcoding to Lower Spatio-Temporal Resolutions and Different Encoding Formats, IEEE Service Center, Piscataway, NJ, vol. 2, No. 2, Jun. 2000, XP011036214.

Jeongnam Youn et al, "Motion Estimation for High Performance Transcoding," IEEE Transactions on Consumer Electronics, ISSN 0098-3063, vol. 44, No. 3, Aug. 1998, pp. 649-658, XP011008621, IEEE, Piscataway, NJ.

Björk N. et al., "Transcoder Architectures for Video Coding," IEEE Transactions On Consumer Electronics, IEEE Service Center, New York, NY, vol. 44, No. 1, Feb. 1998, pp. 88-98, XP000779254, ISSN 0098-3063.

Jeongnam Youn et al., "Motion Vector Refinement for High-Performance Transooding," IEEE Transactions an Multimedia, vol. 1, No. 1, Mar. 1999, pp. 30-40.

* cited by examiner

*Primary Examiner*—Y. Lee
*Assistant Examiner*—Richard Torrente
(74) *Attorney, Agent, or Firm*—Lee, Hong, Degerman, Kang & Waimey

(57) ABSTRACT

A system and method for estimating a motion vector for transcoding digital video is presented. The method includes selecting a direction of an adjustment vector for estimation of a motion vector within a search region, and selecting the adjustment vector having a minimum SAD (sum absolute distance) within the search region.

31 Claims, 3 Drawing Sheets

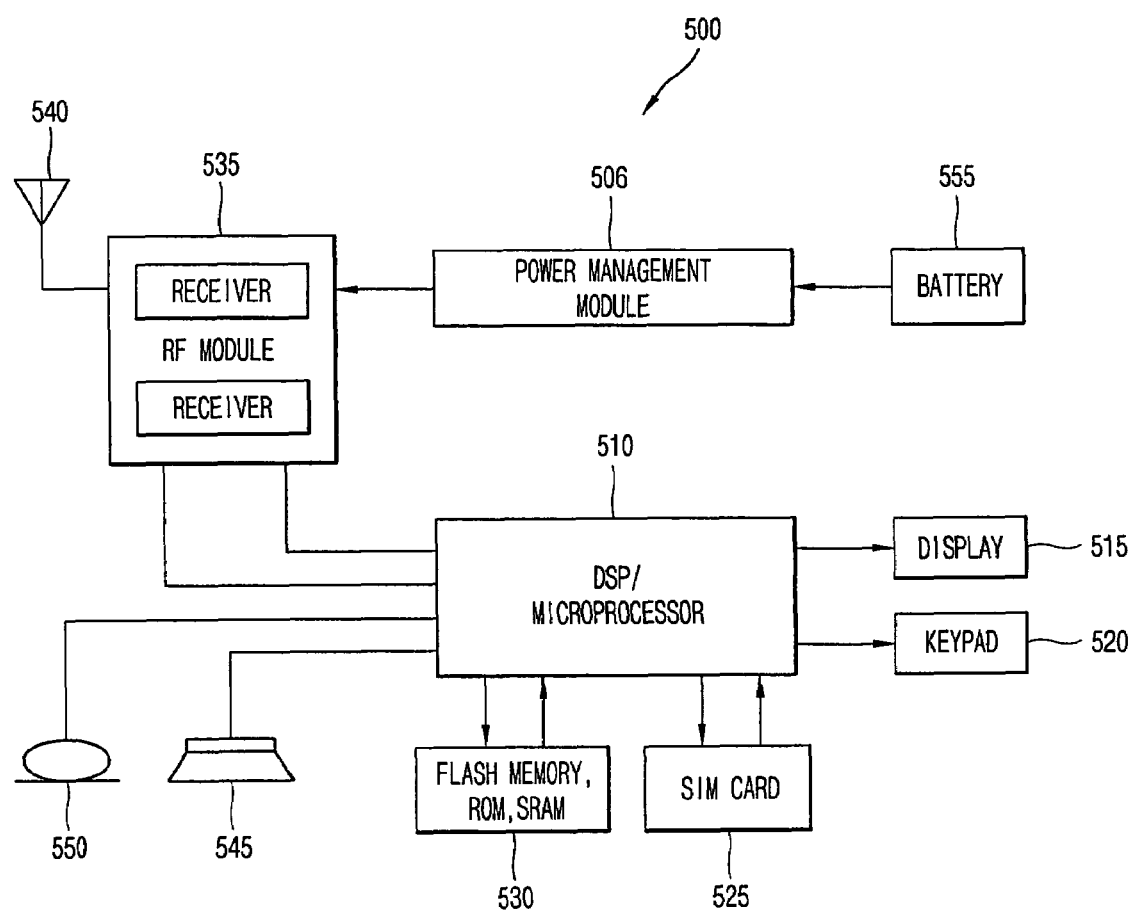

SYSTEM AND METHOD FOR ESTIMATING MOTION VECTOR FOR TRANSCODING DIGITAL VIDEO

CROSS-REFERENCE TO RELATED APPLICATIONS

Pursuant to 35 U.S.C. §119(a), this application claims the benefit of earlier filing date and right of priority to Korean Application No. 10-2003-0083745, filed on Nov. 24, 2003, the contents of which are hereby incorporated by reference herein in their entirety.

BACKGROUND OF THE INVENTION

1. Field of the Invention

The present invention relates to digital video and, more particularly, to a method for estimating a motion vector for transcoding digital video.

2. Description of the Related Art

Video standards and display resolution of terminals receiving video and networks for transmitting video vary, need for transcoding digital video is gradually increasing.

Transcoding is a technique of converting, for example, the format or the size of a video stream for reproduction at different terminals. A first type of transcoding converts a bit stream coded in one video standard into a different video standard. A second type of transcoding converts resolution of video to be compatiable with a display of a receiving terminal. A third type of transcoding converts transmission bit rate of video so as to be suitable for a bandwidth of a network for transmitting the video.

Referring to FIG. 1, a conventional video transcoder includes a decoder 10 for decoding an input bit stream, a signal processor 20 for processing a signal to transcode a signal outputted from the decoder 10, and a coder 30 for estimating and encoding a motion vector of a signal outputted from the signal processor 20. An optimum motion vector is set through motion estimation. Estimation of a motion vector in the video coding is a very complex process as well as in transcoding.

According to conventional video decoding, a transcoder receives from an inputted bit stream that is a compressed video stream. The transcoder selects a base motion vector (BMV) from motion vectors obtained from the inputted bit stream. For estimation of motion vectors, a search region is set around the base motion vector. The search region has a window width approximately two pixels surrounding the base motion vector.

A search is performed within the search region to obtain a sum-and-difference (SAD) between the base motion vector and each pixel of the search region. The motion vector is estimated by using the full search method. A motion vector of a pixel is selected that has the smallest SAD among the calculated SADs. The base motion vector and the motion vector of a pixel with the smallest SAD are summed to create an estimated motion vector. The calculation complexity is increased depending on the number of pixels calculated in the search region. In this example, 25 calculations are required to calculate the SADs associated with 25 pixels.

Therefore, there is a need for improved system and method for estimating motional vectors that overcomes the above problems and provides advantages over conventional coding systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a method for estimating a motion vector for transcoding digital video is provided. The method comprises choosing a direction of an adjustment vector for estimation of a motion vector within a search region and choosing an adjustment vector having a minimum SAD within the search region. The method further comprises estimating the motion vector by summing an adjustment vector and a base motion vector.

The direction of the adjustment vector is along an arbitrary axial direction of the search region. In yet another embodiment, the direction of the adjustment vector is along an arbitrary quadrant direction of the search region. In another embodiment, the direction of the adjustment vector is a direction of an optimum adjustment vector, for example.

The method may further comprise choosing the search region as being centered about a base motion vector. In another embodiment, the method further comprises calculating the base motion vector from an input video stream. The minimum SAD is based on a selection process associated with a plurality of SADs having an adjustment vector within a search region.

In another embodiment, the method further comprises choosing the direction of the adjustment vector further comprises calculating SAD with respect to an adjustment vector centering around the motion vector, choosing a first adjustment vector having a minimum value among a plurality of SADS, and choosing a second adjustment vector having a next lowest minimum value among the plurality of SADs. The method further comprises adding the first adjustment vector and the second adjustment vector to create a third adjustment vector, and determining the direction of the adjustment vector according to the third adjustment vector.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

FIG. 5 is a block diagram illustrating a mobile communication device using the methods of the present invention.

DETAILED DESCRIPTION OF THE PREFERRED EMBODIMENTS

The invention relates to processing video implementing signal-to-noise ratio scalability of a mobile terminal. The method and system of the present invention provide an improved motion vector estimation algorithm. The present invention is described using a sum-absolute difference algorithm (SAD). A SAD algorithm defines a match for the location of the minimum non-normalized absolute error between an x coordinate and a y coordinate.

The SAD of the present invention searches for a direction for an optimum adjustment vector for estimating a motion vector. In one embodiment, depending on the value of the x and y coordinates, the direction of the optimum vector is along an arbitrary axial direction of the search region. In another embodiment, depending on the value of the x and y coordinates, the direction of the optimum vector is along an arbitrary quadrant direction of the search region, for example.

Although the invention is illustrated with respect to a mobile terminal for processing video, it is contemplated that the invention may be utilized in other devices or systems where there is a need for transmitting, receiving, or processing audio and/or video from one location to another location. Reference will now be made in detail to the preferred embodiments of the present invention, examples of which are illustrated in the accompanying drawings.

Figure 1:
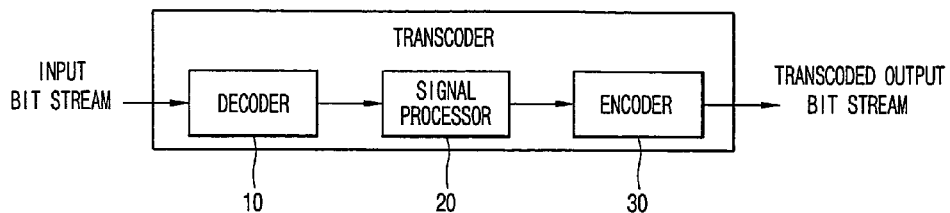
FIG. 1 is a block diagram illustrating a conventional video transcoder.
Figure 2:
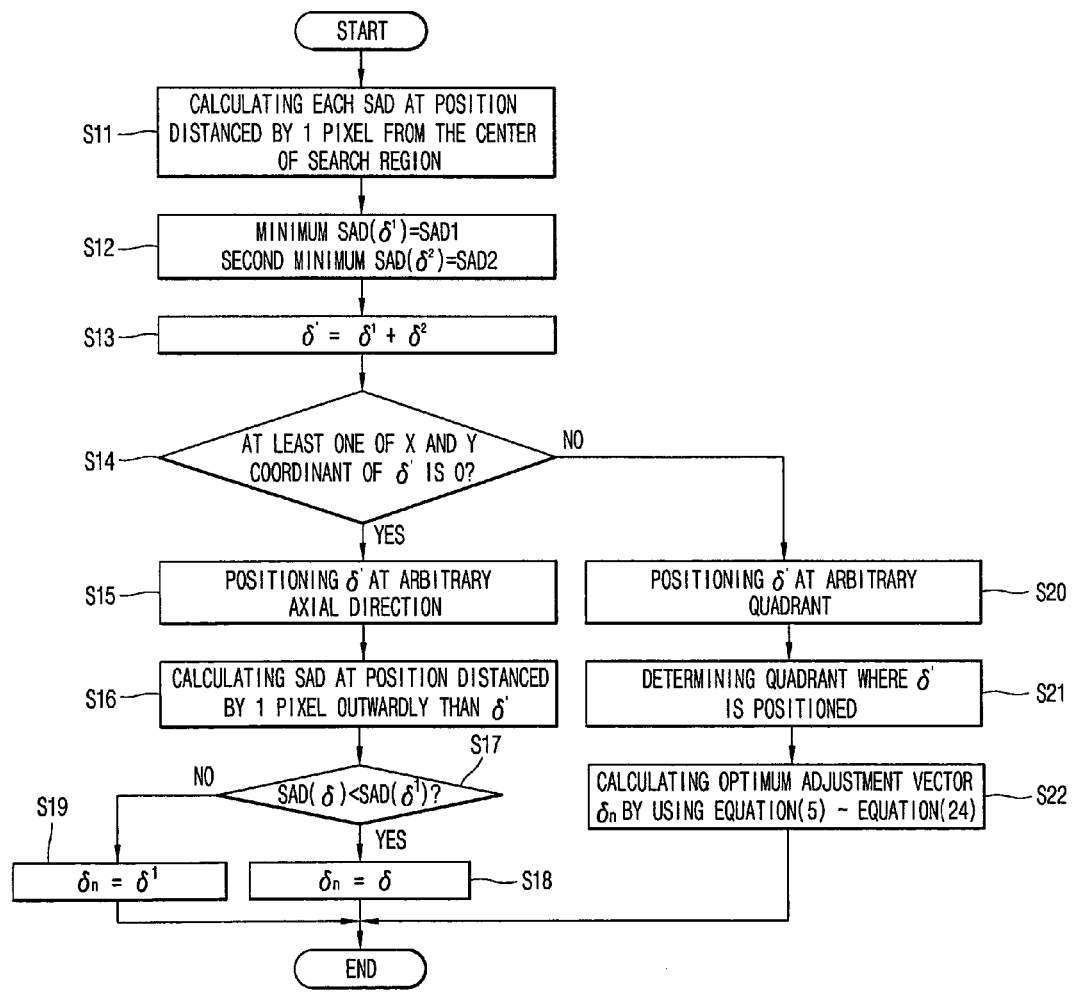
FIG. 2 is a flow chart for estimating a motion vector for transcoding digital video in accordance with an embodiment of the invention.

Referring to FIG. 2, a SAD for estimating a search point of a distance $\delta$ from a base motion vector ($V_n^0$) is expressed as:

$$\delta_n = \arg\min_{\delta \in S_D \times S_D} SAD(\delta) \quad (2)$$

In equation (1), a base motion vector ($V_n^0$) is calculated from a bit stream inputted to a transcoder, a $f_k$ is the kth frame, $\Omega_n$ is the nth macroblock of $f_k$, 'p' is a position vector having vector coordinates $[x, y]^T$ for an image or video, and '$\delta$' is an adjustment vector.

The optimum adjustment vector ($\delta_n$) is calculated that minimizes the SAD in the search region [−2, +2] as described above in equation (1). The optimum adjustment vector ($\delta_n$) expressed by equation (2) is:

$$SAD(\delta) = \sum_{p \in \Omega_n} |f_k(p) - f_{k-1}(p + V_n^0 + \delta)| \quad (1)$$

In equation (2), $S_D$ is a search region approximately in [−2, +2] pixel region about a base motion vector. SADs are calculated for vector coordinates within the search region. SAD's, in one example, are calculated for the vector coordinates (SAD(0,0),SAD(0,1),SAD(0,−1),SAD(1,0),SAD(−1,0)) with respect to adjustment vectors (S11). In this example, the adjustment vectors having a first search point (1) are (0,0), (0,1), (0,−1), (1,0), (−1,0) (see FIG. 3).

A SAD ($\delta$) having the smallest value among the calculated SADs is defined as SAD1. A SAD ($\delta$) having the smallest value among the remaining SADs is SAD2 (S12). SAD1 utilizes an adjustment vector identified as $\delta^1$. SAD2 utilizes an adjustment vector identified as $\delta^2$. $\delta'^t$ is a summed adjustment vector from SAD1 and SAD2 (S13).

A decision is made regarding $\delta'$ if at least one of an x coordinate and a y coordinate of the motional vector is set to zero (S14). If $\delta'$ is zero because both x coordinate and the y coordinate are zero, $\delta'$ is positioned at or along an arbitrary axial direction (S15). The adjustment vectors positioned along the same axial line are added to coordinates (0,0). Otherwise, if at least one of the x coordinate and the y coordinate is 0, $\delta'$ is positioned at or along an arbitrary axis direction of a motion vector field. In this state, the axial direction having the minimum SAD exists along the direction of the motion vector field.

When $\delta^1$ sets the direction of the motion vector field, a SAD ($\delta$) is positioned approximately one pixel from $\delta^1$ toward the outer edge of the search region (S16). $\delta$ has a position indicated as a second search point (2). The second search point (2) is defined as $\delta = 2 \times \delta^1$.

An optimum adjustment vector $\delta_n$ is calculated from equations (3) and (4) below:

$$\text{If } (SAD(\delta) < SAD(\delta^{-1})) \delta_n = \delta \quad (3)$$

$$\text{Else } \delta_n = \delta^1 \quad (4)$$

A value of SAD ($\delta$) is compared to a value of SAD ($\delta^1$) (S17). If the value of SAD($\delta$) is less than the value of SAD ($\delta^1$), the optimum adjustment vector $\delta_n$ is $\delta$ (S18). However, If the value of SAD ($\delta^1$) is less than the value SAD($\delta$), the optimum adjustment vector $\delta_n$ is $\delta^1$ (S19). The adjustment vector having the minimum value SAD is the optimum adjustment vector.

If neither the x coordinate and y coordinate is zero (S14), an arbitrary quadrant where $\delta'$ position corresponds to the direction of a motion vector field (S20). The adjustment vectors are added to adjacent axes. In this example, the adjustment vectors are added to the adjacent axes (0,1) and (1,0); (0,1) and (−1,0); (0,−1) and (1,0); and (0,−1) and (−1,0). $\delta'$ is positioned at a third search point (3).

$\delta'$ is determined to be positioned in one of four quadrants (S21). Within the quadrant $\delta'$ is positioned, a SAD at the fourth search point (4) is compared to the SAD located at the third search point (3). The result of the comparison is the optimum adjustment vector $\delta_n$ (S22).

If $\delta'$ is positioned at the first quadrant, the optimum adjustment vector $\delta_n$ is calculated using equations (5) through (9):

```
If(SAD(δ') < SAD(δ' +(1,0))){If (SAD(δ' +(0,−1))) δ_n = δ'         (5)
Else {SAD(δ') < SAD(δ' +(1,0))){If (SAD(δ' +(1,−1))) δ_n = δ' +     (6)
(0,−1)
Else δ_n = δ' +(1,−1);                                               (7)
}} Else{If(SAD(δ' +(1,0))< (SAD(δ' +(1,−1)) δ_n = δ' + (1,0);        (8)
    Else δ_n = δ' + (1,−1);                                          (9)
}
```

If δ' is positioned at the second quadrant, the optimum adjustment vector $\delta_n$ is calculated using equations (10) to (14):

```
If(SAD(δ') < SAD(δ' +(1,0))){
    If{SAD(δ') < SAD(δ' +(0,−1))) δ_n = δ'                           (10)
    Else{
        If(SAD(δ' +(0,−1))< SAD(δ' +(1,−1)) δ_n = δ' + (0,−1);       (11)
        Else δ_n = δ' + (−1,−1);                                     (12)
    }
}
Else{
    if(SAD(δ' +(−1,0))< SAD(δ' +(−1,−1)))δ_n = δ' + (−1,0);          (13)
    Else δ_n = δ' + (−1,−1);                                         (14)
}
```

If δ' is positioned within the third quadrant, the optimum adjustment vector $\delta_n$ is calculated using equations (15) to (19) shown below:

```
If(SAD(δ') < SAD(δ' +(−1,0))){
    If(SAD(δ') < SAD(δ' +(1,0))) δ_n = δ';                           (15)
    Else { If{SAD(δ' +(0,1))} < SAD(δ' +(−1,1))} δ_n = δ' + (0,1);   (16)
        Else δ_n = δ' + (−1,1);                                      (17)
    }
}
Else{
    If(SAD(δ' +(−1,0))< SAD(δ' +(−1,1)) δ_n = δ' + (−1,0);           (18)
    Else δ_n = δ' + (−1,1);                                          (19)
}
```

If δ' is positioned at the fourth quadrant, the optimum adjustment vector $\delta_n$ is calculated using equations (20) through (24):

```
If(SAD(δ') < SAD(δ' +(1,0))){
    If{SAD(δ') < SAD(δ' +(0,−1))) δ_n = δ'                           (20)
    Else{
        If(SAD(δ' +(0,−1))< SAD(δ' +(1,1)) δ_n = δ' + (0,1);         (21)
        Else δ_n = δ' + (1,1);                                       (22)
    }
}
    Else{
        if(SAD(δ' +(−1,0))< SAD(δ' +(1,1)))δ_n = δ' + (1,0);         (23)
        Else δ_n = δ' + (1,1);                                       (24)
}
```

A final motion vector ($V_n^0$) allocated to the nth macroblock, by equation (25), is the optimum adjustment vector $\delta_n$ added to the base motion vector.

$$V_n^0 = V_n^0 + \delta n \qquad (25)$$

The present invention estimating the motion vector at chosen points results in reduced calculation complexity, saving processing steps, compared to conventional full search motional vector calculations. In the invention, if the optimum adjustment vector exists at a certain axis, SADs are calculated six times, for example. If the optimum adjustment vector exists at an arbitrary quadrant, SADs are calculated eight times or nine times. Optimum adjustment vectors obtained from equations (5), (7), (8) and (9), SADs are calculated eight times, for example. To calculate the optimum adjustment vector obtained from equation (6), SADs are calculated nine times, for example.

Assuming that the probability that the optimum adjustment vector exists at a certain axis and probability that the optimum adjustment vector exists at an arbitrary quadrant are equal, SADS for one macrocell are on the average calculated seven times, for example.

Reference materials having a search region beyond a [−2,2] window would increase calculation complexity and decrease accuracy of the estimated motion vector. A search region [−2,+2] is the most preferable in consideration of the calculation (See T. Shanableh and M. Ghanbari, "Heterogeneous video transcoding to lower spatial-temporal resolutions and different encoding formats" (IEEE Trans. Multimedia, Vol. 2, No. 2, pp. 101-110, June 2000).

Figure 4:
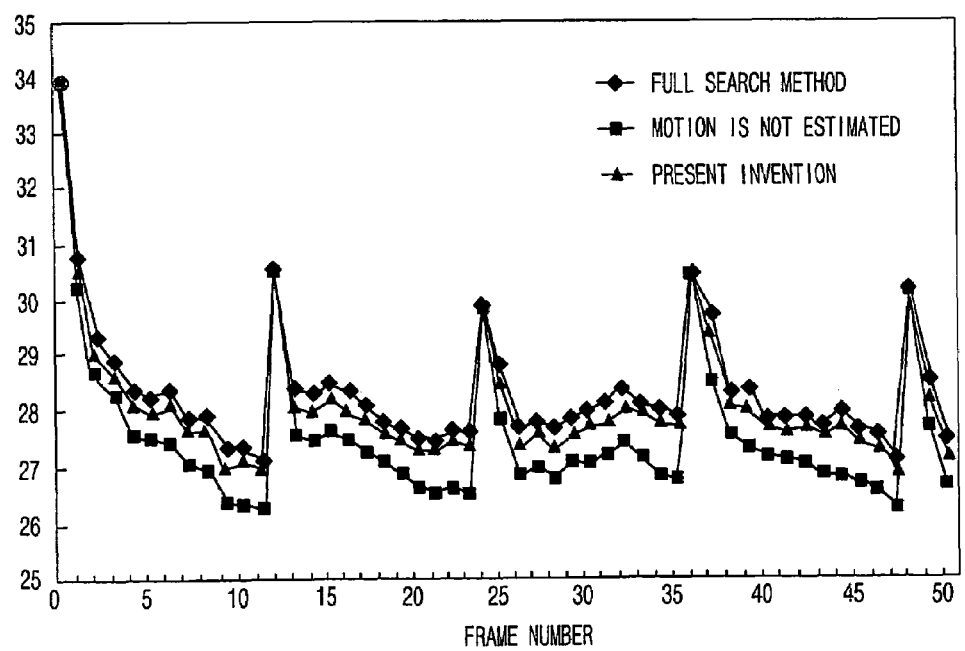
FIG. 4 is a graph showing Peaking Signal-to-Noise Ratio performance between the present invention motion vector estimation method and that of a conventional estimating method.

Referring to FIG. 4, an image is transcoded from a high bit-rate MPEG-1 image to a low bit-rate MPEG-1 image. The test image is a 'football'. 50 frames of the test image are coded using MPEG-1. In this example, the size of GOP is 12 and a B-frame does not exist. Experimental results show that a motion vector estimated using the present invention improves peak signal to noise ratio (PSNR) performance. The present invention shows also almost the same PSNR performance as that of the conventional motion vector estimating method employing a full search method.

The motion estimation method of the present invention provides a calculation complexity reduction as much as 70% through reducing the number of search points required to estimate a motion vector. The motion estimation method of the present invention provides almost identical PSNR performance as that of the convention vector estimating method employing the full search method.

The following are examples including a mobile communication device and a mobile communication network using the method of the present invention.

Referring to FIG. 5, the mobile communication device 500 comprises a processing unit 510 such as a microprocessor or digital signal processor, an RF module 535, a power management module 506, an antenna 540, a battery 555, a display 515, a keypad 520, a storage unit 630 such as flash memory, ROM or SRAM, a speaker 545 and a microphone 550.

A user enters instructional information, for example, by pushing the buttons of a keypad 520 or by voice activation using the microphone 550. The processing unit 510 receives and processes the instructional information to perform the appropriate function. Operational data may be retrieved from the storage unit 630 to perform the function. Furthermore, the processing unit 510 may display the instructional and operational information on the display 515 for the user's reference and convenience.

The processing unit 510 issues instructional information to the RF module 535, to initiate communication, for example, transmit radio signals comprising voice communication data. The RF module 535 comprises a receiver and a transmitter to receive and transmit radio signals. The antenna 540 facilitates the transmission and reception of radio signals. Upon receive radio signals, the RF module 535 may forward and convert the signals to baseband frequency for processing by the processing unit 510. The processed signals would be transformed into audible or readable information outputted via the speaker 645.

Figure 3:
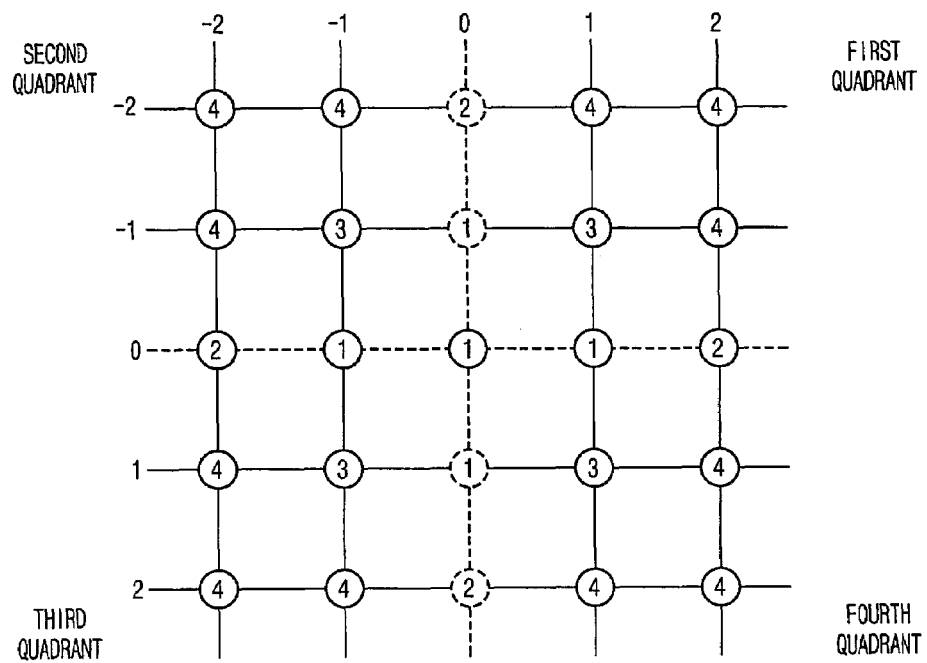
FIG. 3 is a block diagram illustrating a search pattern for applying the motion vector estimating method of FIG. 2 in accordance with an embodiment of the invention.

The processing unit 510 performs the methods and provides the systems as illustrated in FIGS. 2-4. As an example, the processing unit 510 for estimating a motion vector for transcoding digital video, the method comprising choosing a direction of an adjustment vector for estimation of a motion vector within a search region; and choosing an adjustment vector having a minimum SAD within the search region.

Other features, as described above in FIG. 2-4, may be incorporated as well into the processing unit 510.

The processing unit 510 stores the messages received from and messages transmitted to other users in the storage unit 530, receive a conditional request for message input by the user, process the conditional request to read data corresponding to the conditional request from the storage unit. The processing unit 510 outputs the message data to the display unit 515. The storage unit 530 is adapted to store message data of the messages both received and transmitted.

Although the present invention is described in the context of a mobile terminal, the present invention may also be used in any wired or wireless communication systems using mobile devices, such as PDAs and laptop computers equipped with wired and wireless wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention. Further, with respect to the claims, it should be understood that any of the claims described below may be combined for the purposes of the present invention.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail hereinabove.

What is claimed is:

1. A method for estimating a motion vector for transcoding digital video, the method comprising:
    storing digital video data in a storage unit;
    retrieving the digital video data from the storage unit via a processing unit;
    selecting a direction of an adjustment vector for estimation of a motion vector within a search region via the processing unit, wherein selecting the direction of the adjustment vector further comprises:
    calculating a plurality of SADs (sum of absolute difference) with respect to a plurality of adjustment vectors centering around an existing motion vector within the search region;
    selecting a first adjustment vector having a minimum value among the plurality of SADs;
    selecting a second adjustment vector having a next least minimum value among the plurality of SADs;
    adding the first adjustment vector and the second adjustment vector to create a third adjustment vector;
    determining the direction of the adjustment vector according to the third adjustment vector; and
    selecting the adjustment vector having a minimum SAD within the search region,
    wherein the first adjustment vector and the second adjustment vector are selected from the same plurality of SADs within the search region.

2. The method of claim 1, further comprising estimating the motion vector by summing the adjustment vector and a base motion vector.

3. The method of claim 2, further comprising calculating the base motion vector from an input video stream.

4. The method of claim 1, wherein the direction of the adjustment vector is along an arbitrary axial direction of the search region.

5. The method of claim 4, wherein the systematic fashion further comprises comparing the third vector to adjacent adjustment vectors in a one-pixel-by-one-pixel quadrant, and the optimum adjustment vector is stored after each comparison, and is replaced if a SAD is lower than the previous value for the SAD.

6. The method of claim 1, wherein the direction of the adjustment vector is along an arbitrary quadrant direction of the search region.

7. The method of claim 6, wherein the systematic fashion further comprises comparing the third vector to adjacent adjustment vectors in a one-pixel-by-one-pixel quadrant, and the optimum adjustment vector is stored after each comparison, and is replaced if a SAD is lower than the previous value for the SAD.

8. The method of claim 1, wherein the direction of the adjustment vector is along a direction of an optimum adjustment vector.

9. The method of claim 8, wherein the systematic fashion further comprises comparing the third vector to adjacent adjustment vectors in a one-pixel-by-one-pixel quadrant, and the optimum adjustment vector is stored after each comparison, and is replaced if a SAD is lower than the previous value for the SAD.

10. The method of claim 1, further comprising calculating the motion vector from an input bit stream.

11. The method of claim 10, wherein the systematic fashion further comprises comparing the third vector to adjacent adjustment vectors in a one-pixel-by-one-pixel quadrant, and the optimum adjustment vector is stored after each comparison, and is replaced if a SAD is lower than the previous value for the SAD.

12. The method of claim 1, further comprising selecting the search region as being centered around a base motion vector.

13. The method of claim 12, wherein the systematic fashion further comprises comparing the third vector to adjacent adjustment vectors in a one-pixel-by-one-pixel quadrant, and the optimum adjustment vector is stored after each comparison, and is replaced if a SAD is lower than the previous value for the SAD.

14. The method of claim 1, wherein the minimum SAD is based on a selection process associated with a plurality of SADs each having the adjustment vector within the search region.

15. The method of claim 1, wherein the search region is a window of at least two pixels centered about a base motion vector.

16. The method of claim 1, wherein the existing motion vector is a base motion vector and calculating a SAD with respect to the plurality of adjustment vectors being centered at least one pixel about the base motion vector.

17. The method of claim 1, wherein determining the direction of the adjustment vector further comprises:
selecting a random quadrant of the motion vector field as the direction of the adjustment vector if at least an x-vector or a y-vector coordinate of the third adjustment vector equals zero.

18. The method of claim 1, wherein determining the direction of the adjustment vector further comprises:
selecting a quadrant of the third adjustment vector as the direction of the adjustment vector if the third adjustment vector has a non-zero value in both the x-vector coordinate and the y-vector coordinate.

19. A method for estimating a motion vector for transcoding digital video, comprising:
storing digital video data in a storage unit;
retrieving the digital video data from the storage unit via a processing unit;
calculating a plurality of SADs (sum of absolute difference) of each adjustment vector positioned at a distance of approximately one pixel from central coordinates of a base motion vector within a search region via the processing unit;
summing a first adjustment vector having a minimum value among the plurality of SADs and a second adjustment vector having a second to least minimum value to create a third adjustment vector; and
determining a direction of an optimum adjustment vector based upon at least an x coordinate or a y coordinate of the third adjustment vector equaling zero,
wherein the first adjustment vector and the second adjustment vector are selected from the same plurality of SADs within the search region.

20. The method of claim 19, further comprising determining the optimum vector by comparing a SAD of an adjustment vector approximately one pixel from the first adjustment vector if the direction of the optimum adjustment vector is along an arbitrary axial direction.

21. The method of claim 19, further comprising determining the optimum adjustment vector by comparing a SAD of the third adjustment vector included in a quadrant to an SAD calculated from the remaining adjustment vector if the direction of the optimum adjustment vector is within the corresponding quadrant.

22. The method of claim 19, wherein determining the direction of the optimum adjustment vector comprises selecting the direction of the optimum motion vector as an arbitrary axis direction where the first adjustment vector is positioned when either the x coordinate or the y coordinate is zero of the third adjustment vector.

23. The method of claim 19, wherein determining the direction of the optimum adjustment vector comprises selecting the direction of optimum motion vector in an arbitrary quadrant where the third adjustment vector is positioned, if the x coordinate and the y coordinate of the third adjustment vector do not equal zero.

24. The method of claim 19, wherein determining the optimum adjustment vector when the direction of the optimum adjustment vector is an arbitrary axial direction comprises:
selecting the adjustment vector as the optimum adjustment vector if the SAD of the adjustment vector is less than the SAD of the first adjustment vector, and selecting the first adjustment vector as the optimum adjustment vector if the SAD of the adjustment vector is greater than or equal to the SAD of the first adjustment vector.

25. The method of claim 19, further comprising calculating the optimum adjustment vector upon determining a direction of the optimum adjustment vector along a first quadrant.

26. The method of claim 25, wherein calculating the optimum adjustment vector comprises:
comparing SADs in an approximately one pixel search region about the third vector coordinate in a systematic fashion; and
selecting the minimum value SAD as the value for the optimum adjustment vector.

27. The method of claim 25, wherein the systematic fashion further comprises comparing the third vector to adjacent adjustment vectors in a one-pixel-by-one-pixel quadrant, and the optimum adjustment vector is stored after each comparison, and is replaced if a SAD is lower than the previous value for the SAD.

28. The method of claim 19, further comprising calculating the optimum adjustment vector when the direction of the optimum adjustment vector is a second quadrant.

29. The method of claim 28, wherein calculating the optimum adjustment vector comprises:
comparing SADs in an approximately one pixel search region about the third vector coordinate in a systematic fashion; and
selecting the minimum value SAD as the value for the optimum adjustment vector.

30. The method of claim 19, wherein determining the direction of the optimum adjustment vector when the direction of the optimum adjustment vector is along a third quadrant comprises:
comparing SADs in an approximately one pixel search region of the third vector coordinate in a systematic fashion; and
selecting the minimum value SAD as the value for the optimum adjustment vector.

31. The method of claim 19, further comprising determining the direction of the optimum adjustment vector when the direction of the optimum adjustment vector is along a fourth quadrant comprises:
comparing SADs in an approximately one pixel search region of the third vector coordinate in a systematic fashion; and
selecting the minimum value SAD as the value for the optimum adjustment vector.

* * * * *